Patented Jan. 21, 1936

2,028,267

UNITED STATES PATENT OFFICE 2,028,267

MANUFACTURING KETONES

Francis M. Archibald and Clayton M. Beamer, Elizabeth, N. J., assignors to Standard Alcohol Company, a corporation of Delaware No Drawing. Application April 5, 1933,
Serial No. 664,556

5 Claims. (Cl. 260—134)

This invention relates to an improved process for the manufacture of ketones from corresponding secondary alcohols and is an improvement over the process described in U. S. Patent 1,460,876.

The general reaction involved may be represented by the following equation:

$$RR'CHOH \rightarrow RR'CO + H_2$$

One feature of the invention is the use of an improved catalyst for effecting the desired reaction. In the prior patent referred to, ketones are manufactured according to the same general reaction by subjecting secondary alcohols to the action of brass at temperatures ranging from 500 to 600° C. with or without the addition of oxygen. It has now been found that the catalyst is greatly improved by the addition of a small amount of tin, chromium, nickel, or the like. The reasons for this added element are several-fold. First, it has been found to increase the catalytic activity of the copper-zinc catalyst and furthermore, it increases the resistance to sulfur corrosion and thereby prevents the deterioration of the catalyst. Usually only a small percentage of this added element is necessary, ordinarily only 1 to 2% being sufficient although considerably more, say up to 5 or 10%, may be used depending upon the proportions of zinc and copper or other metals in the catalyst. In other words, the invention comprises chiefly the addition, to known catalysts which promote the dehydrogenation of secondary alcohols to ketones, of a substance which serves both to increase the catalytic activity and at the same time increase the resistance to sulfur corrosion and thereby maintain the hardness and original physical form of the catalyst particles.

Another feature of the invention is the use of a knockout chamber or a purifier after vaporization but before the catalytic treatment. The purpose of this purifying chamber is to remove the polymer which results from the partial decomposition of alcohol vapors or impurities in the alcohol. This polymer usually contains a high concentration of the sulfur content of the alcohol feed and therefore the removal of the polymer serves to reduce the sulfur content of the finished product and at the same time helps to prolong the life of the catalyst. The detailed construction of this knockout chamber is not important, the chief requirement being the provision of baffles in order to throw down the higher molecular weight polymers, and a draw-off valve at the bottom.

In carrying out the invention, a secondary alcohol is vaporized in any suitable manner such as by indirect steam heat. The vapor then having about 20% of superheat is passed through a knockout chamber to remove polymers and other entrained impurities. The vapor is then preheated and passed on to the catalyst chamber which is maintained at a suitable reaction temperature which may be between the approximate limits of 400 and 600° C. depending upon the particular alcohol feed being treated. The catalyst preferably consists of brass turnings of the desired composition and having a medium, coarse texture. In other words, it should be screened to a fairly uniform size such as, for example, 4 to 8 mesh or 14 to 28 mesh or larger or smaller depending upon the relative size of the catalyst chamber and the rate of flow of the vapors. The catalyst should also be uniformly packed to prevent channeling. The reaction product coming from the chamber is then passed through a condenser and the uncondensed gas, which is largely hydrogen, is scrubbed with oil to remove entrained liquid. The condensate is purified by a wash with dilute caustic soda and fractional distillation.

Although the composition of the catalyst may vary within rather wide limits, a preferable composition is:

| | Percent |
|---|---|
| Copper | 60.0 |
| Zinc | 38.5 |
| Tin | 1.5 |
| | 100.0 |

An appreciably higher content of zinc makes the catalyst subject to fusion at local points where the reaction temperature may become excessively high. An appreciably lower content of zinc may make the catalyst subject to decomposition into copper sulfide which foliates and stops up the vapor space.

Although the process is intended for the conversion of any secondary alcohol to the corresponding ketone, it finds particular advantages for the treatment of secondary hexyl alcohol which, on account of its relatively low reactivity and the high concentration of impurities in it, cannot otherwise be practically converted into the corresponding ketone. The present process accomplishes this conversion in a very satisfactory manner with a high yield. Other secondary alcohols which have been treated according to the invention are the isopropyl, butyl, and amyl alcohols.

For the sake of illustration only and without intention of being limited thereto, the following examples are given:

Example 1

Feed—secondary hexyl alcohol vapors
Size of chamber—7" x 36"
Catalyst—brass turnings
Depth of catalyst—18"
Composition of catalyst—Cu 60%, Zn 38.5%, Sn 1.5%
Feed rate—6.5 gals. per hour Temperatures
- Outlet steam vaporizer—160° C.
- Outlet electric preheater—470° C.
- Bottom of catalyst—475° C.
- Top of catalyst—485° C.

Gas evolved—143 cu. ft. per hour
Percent alcohol converted to ketone—75%
Percent liquid recovery—96%
Uniform operation up to 10 days and after

Example 2

Feed—secondary hexyl alcohol vapors
Size of chamber—1" x 32"
Catalyst—Mercalloy 2
Depth of catalyst—20" (a secret iron alloy containing about 18% chromium, 8% nickel and small amounts of other elements)
Composition of catalyst—Cu 60%, Zn 10%, Ni 25%, Sn 3%, Fe 2%
Feed rate—⅛ gal. per hour
Catalyst temperature 525° C.
Percent alcohol converted to ketone—64%
Percent liquid recovery—95%
Uniform operation up to 12 hours and after In one test a feed stock containing 0.3% sulfur gave a yield of 0.5% polymer in the knockout chamber. This polymer boiled at 200° C. and contained 1.0% sulfur.

In carrying out the invention it is generally desirable to use a corrosion-resistant metal for the catalyst chamber walls as it has been found that the presence of free iron catalytically promotes the formation of carbon, which not only decreases the yield and forms by-products but also tends to clog up the catalyst. The walls of the chamber may be suitably constructed out of a corrosion-resistant alloy such as Allegheny metal or the like. The composition of Allegheny metal is approximately, chromium 16 to 20%, nickel 7 to 10%, manganese less than 0.5, carbon less than 0.12, remainder iron.

It may be desirable under some circumstances to recycle some of the unreacted secondary alcohol after recovering same from the products of the reaction. In such a case, the ketone formed may be separated from the unconverted alcohol by any desirable means such as distillation, fractionation, condensation, or the like. Another alternative in the process is the addition of oxygen along with the alcohol in order to facilitate the dehydrogenation. This may be done in any suitable manner such as by the introduction of air and in such a case, the combustion of the oxygen with the liberated hydrogen helps to maintain the catalyst chamber at the desired reaction temperature, although this method of operating carries with it the disadvantage of yielding impurities which are difficult to remove and constitute a distinct material loss.

During the course of the conversion of the alcohols into ketones, hydrogen sulfide is liberated and as a result the catalyst becomes coated with metallic sulfides and is activated thereby.

It is not desired to be limited by any of the specific examples given or any of the theories of the operation of the invention which have been advanced but it is intended to claim all inherent novelty in the invention as broadly as the prior art permits.

We claim:

1. The improved process for the manufacture of ketones, which comprises subjecting the vapors of aliphatic secondary alcohols to a catalyst consisting essentially of copper, zinc, and tin.

2. The improved process for the manufacture of ketones, which comprises subjecting the vapors of aliphatic secondary alcohols to a catalyst having approximately the following composition: copper 60.0%, zinc 38.5%, and tin 1.5%.

3. Process for manufacturing ketones, which comprises subjecting the vapors of a aliphatic secondary alcohol of low reactivity to the action of a metallic catalyst comprising a major proportion of copper and zinc and a minor proportion of a metal of the group tin, chromium and nickel serving to promote the catalytic activity of said catalyst.

4. The process which comprises subjecting the vapors of secondary hexyl alcohol to the action of a catalyst comprising essentially copper and zinc with a small amount of tin at a dehydrogenating temperature.

5. The process which comprises subjecting the vapors of higher aliphatic secondary alcohols to the action of a catalyst comprising essentially copper and zinc with a small amount of tin at a dehydrogenating temperature.

FRANCIS M. ARCHIBALD.
CLAYTON M. BEAMER.